(12) United States Patent
Mizue et al.

(10) Patent No.: US 8,480,313 B2
(45) Date of Patent: Jul. 9, 2013

(54) OPTICAL SUBASSEMBLY HAVING SLEEVE AND OPTICAL DEVICE ASSEMBLED WITH SLEEVE BY RIBS AND HOLLOW

(75) Inventors: Toshio Mizue, Yokohama (JP); Tomoya Saeki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 16 days.

(21) Appl. No.: 12/721,056

(22) Filed: Mar. 10, 2010

(65) Prior Publication Data

US 2010/0232750 A1 Sep. 16, 2010

(30) Foreign Application Priority Data

Mar. 10, 2009 (JP) .................. 2009-056707

(51) Int. Cl.
*G02B 6/36* (2006.01)
(52) U.S. Cl.
USPC ................... 385/93; 385/91; 385/94
(58) Field of Classification Search
USPC .......................................... 385/92
See application file for complete search history.

(56) References Cited

U.S. PATENT DOCUMENTS

| 4,678,272 A * | 7/1987 | Finn et al. ............... 385/99 |
| 5,596,665 A * | 1/1997 | Kurashima et al. ........ 385/92 |
| 6,354,747 B1 * | 3/2002 | Irie et al. ............... 385/88 |
| 2003/0099794 A1 * | 5/2003 | Sasaki et al. ........... 428/35.7 |

FOREIGN PATENT DOCUMENTS

| JP | 05-011147 | 1/1993 |
| JP | 08-129118 | 5/1996 |
| JP | 11-242172 | 9/1999 |
| JP | 2002-043675 A | 2/2002 |
| JP | 2006-190783 | 7/2006 |
| JP | 2007-139877 | 6/2007 |
| JP | 2008-116861 A | 5/2008 |

OTHER PUBLICATIONS

Office Action in Japan Patent Application No. 2009-056707 dated Dec. 11, 2012.

* cited by examiner

*Primary Examiner* — Ryan Lepisto
*Assistant Examiner* — Andrew Jordan
(74) *Attorney, Agent, or Firm* — Venable LLP; Michael A. Sartori; Tamatane J. Aga

(57) ABSTRACT

An optical subassembly is disclosed, in which an optical device is assembled with an optical receptacle using an anchor effect for the ultraviolet curable resin. The optical receptacle includes a sleeve portion that receives an external optical fiber and a sheath portion that receives the optical device. A bore formed in the sheath portion circumferentially provides a plurality of ribs; while the pillar portion of the optical device that encloses a semiconductor optical device provides a plurality of hollows in positions corresponding to the ribs. The rib shows the anchor effect for the resin filled within the hollow.

10 Claims, 6 Drawing Sheets

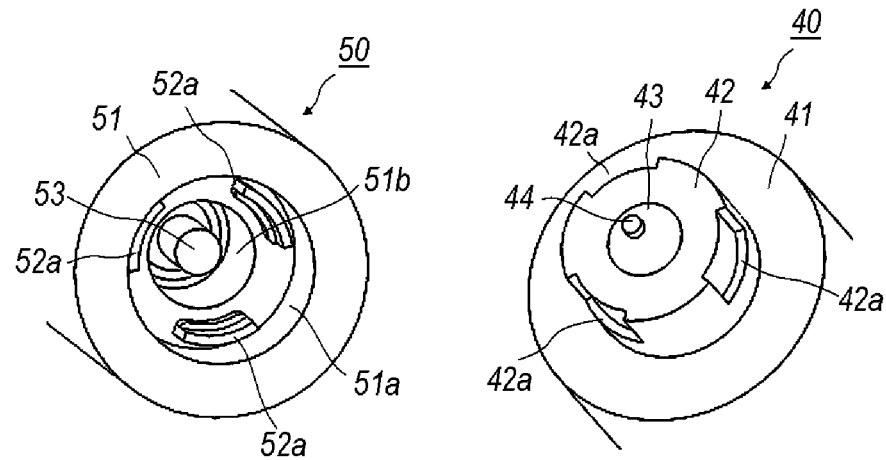
Fig. 5A  Fig. 5B
Fig. 5C
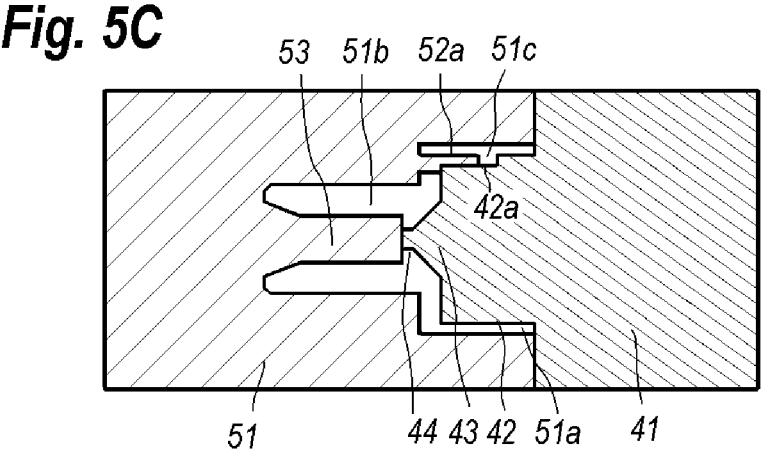

Fig. 6A
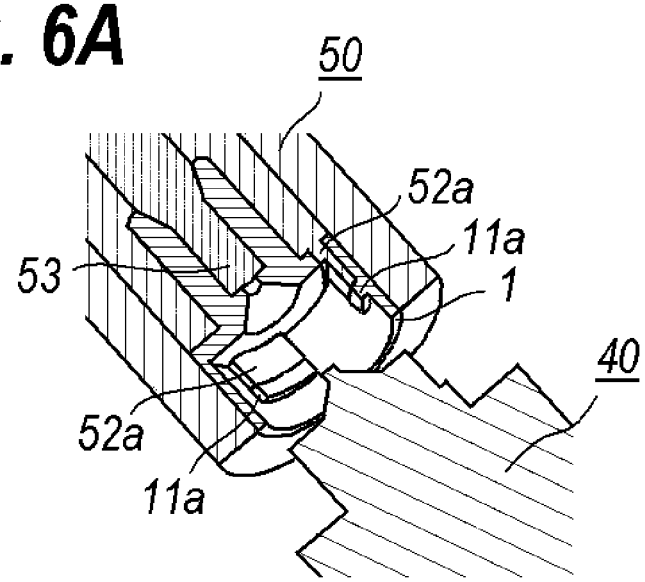
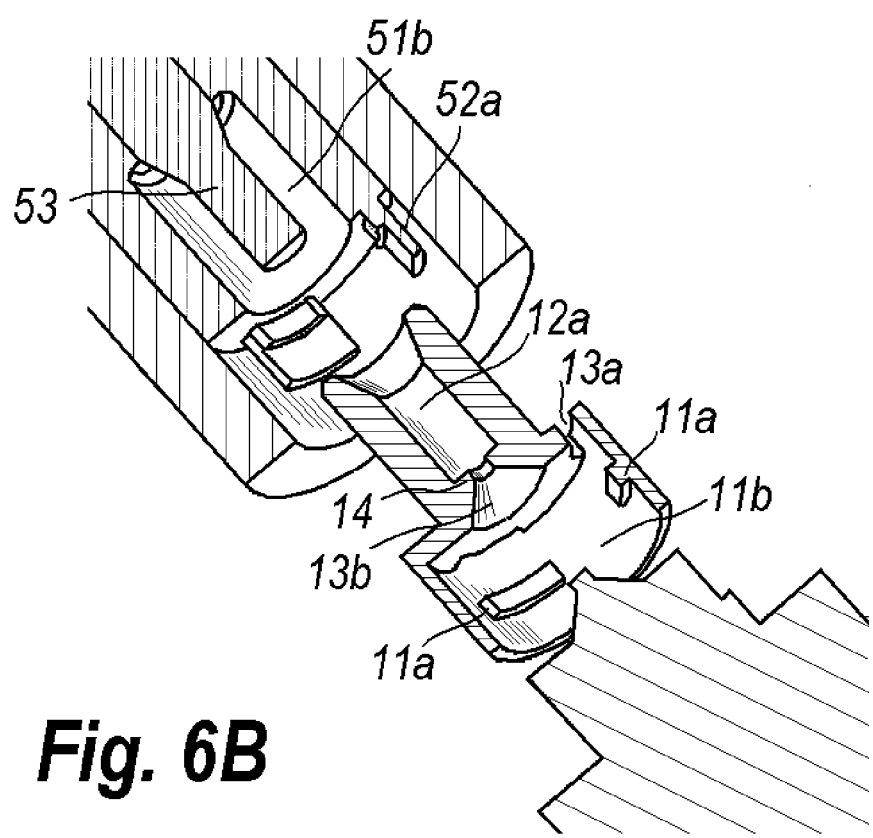
Fig. 6B

OPTICAL SUBASSEMBLY HAVING SLEEVE AND OPTICAL DEVICE ASSEMBLED WITH SLEEVE BY RIBS AND HOLLOW

BACKGROUND OF THE INVENTION

1. Field of the Invention

The present invention relates to an optical subassembly that provides an optical receptacle adhered to an optical device with a transparent resin package.

2. Related Prior Art

The YAG laser welding has been well known in the filed to assemble an optical receptacle with an optical device precisely and firmly. The YAG laser may heat members to be welded so as to melt them locally. Accordingly, the members to be welded are required to have a lesser thermal conductivity to cause the local melting even when they are metallic material.

Recently, an optical subassembly primarily made of resin has been practical by responding to a continuous request to reduce the cost thereof, in particular, the optical subassembly for an application of the short reach has been strongly requested to lower the cost and the price. Such a subassembly often uses a resin package and an adhesive to assemble the subassembly. The optical alignment of the subassembly is required in the alignment between components with the accuracy below several micron-meters, generally smaller than 2 micron-meters for the application using a single mode fiber. Moreover, the optical subassembly with the optical receptacle reiteratively receives an optical plug in the optical receptacle, and is necessary to keep the optical coupling efficiency as withstanding the external stress caused in an insertion/extraction of the optical plug.

To widen an area to be glued and to use an adhesive showing a superior adhesive strength results in a secure adhesion. In the assembly of the optical subassembly, therefore, two types of the adhesive are generally used; one is a type of ultraviolet curable adhesive and the other is a type of thermally curable adhesive. Applying the ultraviolet curable adhesive to members to be attached, aligning the members optically, curing the adhesive by irradiating the ultraviolet rays as the alignment between members are maintained, applying the thermo-curable adhesive and solidifying it by raising an ambient temperature, the optical subassembly primarily with resin bodies is completed.

Japanese Patent Application published as JP-2008-116861A has disclosed an optical subassembly that provides a sleeve member and an optical device each having a resin body and being bonded with the ultraviolet curable resin. The sleeve member has openings or cuttings in a portion to cover the optical device so as to expose the ultraviolet curable resin. The openings or cuttings enhance the hardening of the ultraviolet curable resin. However, openings or cuttings cause a non-uniform thickness of the resin, which results in the optical misalignment between the sleeve member and the optical device during the hardening of the resin. Additionally, although an amount of the curable resin increases, an area to be bonded is not increases, the adhesive strength between the sleeve member and the optical device is not achieved.

The U.S. Pat. No. 5,596,665, has disclosed another optical subassembly, in which a sleeve member and an optical device are attached with an ultraviolet curable resin, in particular, one of the bore of the sleeve member and the periphery of the optical device provides a circumferential hollow and the bore provides a reflective surface for the ultraviolet rays to enhance the hardening of the curable resin by deeply penetrating the ultraviolet rays.

SUMMARY OF THE INVENTION

One of aspects of the present invention relates to an optical subassembly that comprises an optical device and an optical receptacle. The optical device encloses a semiconductor optical device therein. In an embodiment, the optical device has a resin body transparent to light subject to the semiconductor optical device. The optical receptacle, which may be made of resin, includes a sheath portion with a first bore and a sleeve portion with a second bore. The first bore receives the optical device therein, while, the second bore receives an external optical fiber. The first bore provides at least one rib and the optical device provides a hollow in a position corresponding to the rib and being filled with an ultraviolet cured resin. In the present invention, the rib in the first bore shows an anchor effect for the ultraviolet cured resin filling the hollow in the optical device, which enhances bond strength of the ultraviolet cured resin.

The optical receptacle provides an aperture at a step between the sheath portion and the sleeve portion. The aperture exposes a tip portion of the optical device inserted within the first bore; accordingly, the ultraviolet curable resin applied to the tip portion of the optical device may be cured by irradiating the resin with the ultraviolet rays through the aperture.

Another aspect of the present invention relates to a method to assembly the optical subassembly that includes an optical receptacle made of resin and an optical device. The method comprises steps of: (a) applying an ultraviolet curable resin on a periphery of the optical device; (b) inserting the optical device into a first bore in a sheath portion of the optical receptacle; and (c) irradiating the ultraviolet curable resin with ultraviolet rays from a gap between the optical device and the first bore, and through an aperture provided in a deep end of the first bore. Because the ultraviolet rays are irradiated from both sides of the optical device, the curing of the ultraviolet resin may be enhanced even when the first bore provides a rib which hides the top portion of the optical device from the open end of the first bore.

BRIEF DESCRIPTION OF DRAWINGS

The foregoing and other purposes, aspects and advantages will be better understood from the following detailed description of a preferred embodiment of the invention with reference to the drawings, in which:

FIG. 2A illustrates the optical receptacle viewed from the bottom thereof, while, FIG. 2B is viewed from the top;

FIGS. 5A to 5C show an example of the molding die that forms the optical receptacle shown in FIG. 1, where FIG. 5A illustrates the inside of upper die, FIG. 5B illustrates the lower die, and FIG. 5C is a cross section of the upper and lower dies assembled to each other to form a cavity; and FIGS. 6A and 6B show a process to remove the lower and upper dies from the molded optical receptacle.

DESCRIPTION OF PREFERRED EMBODIMENTS

Figure 1:
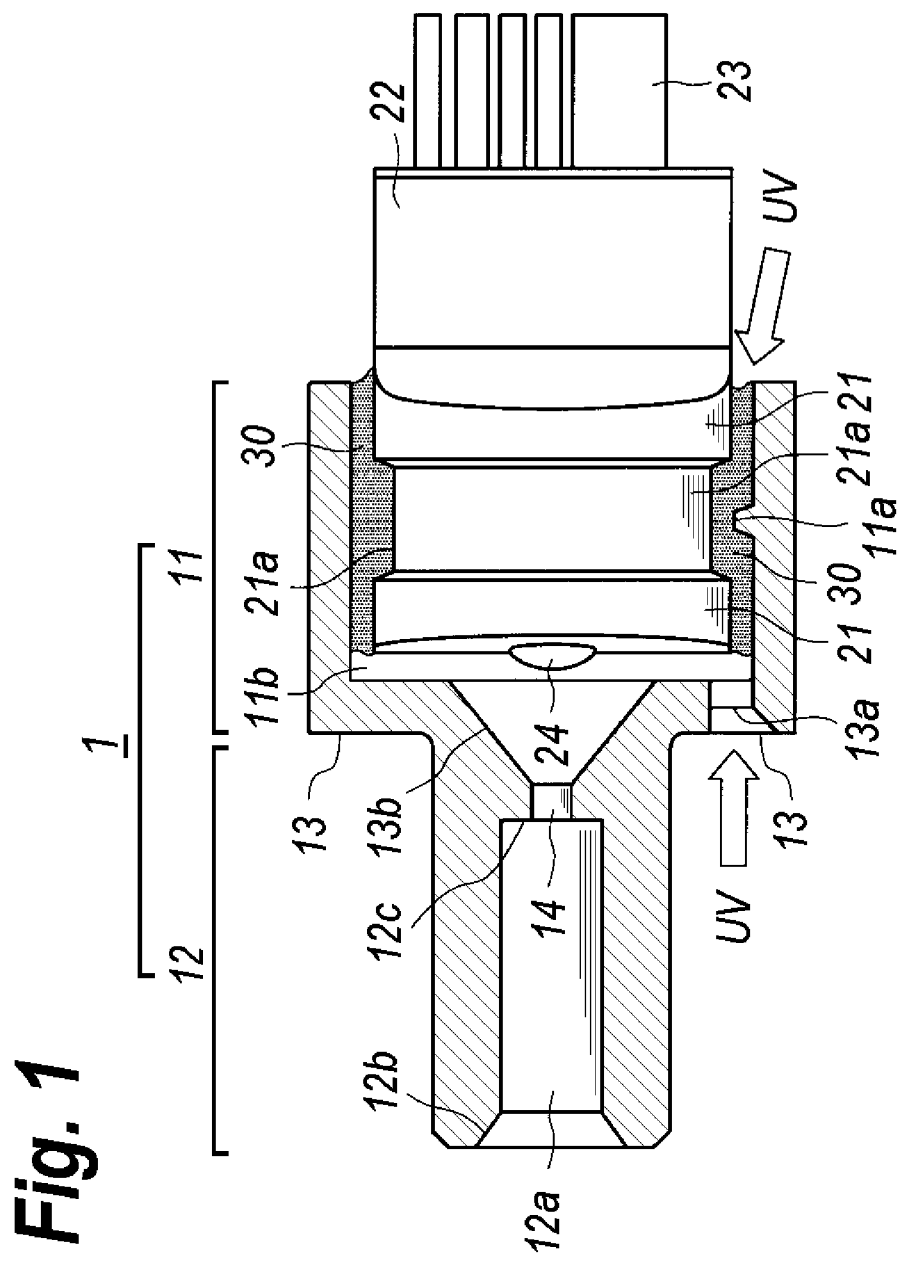
FIG. 1 is a cross section of an optical subassembly according to one embodiment of the present invention.
Figure 2A:
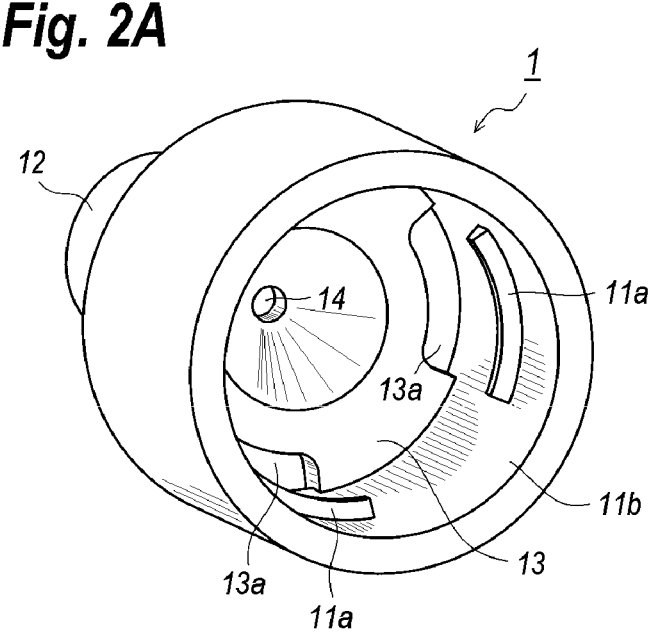
FIGS. 2A and 2B are perspective views of an optical receptacle according to an embodiment of the invention, where
Figure 2B:
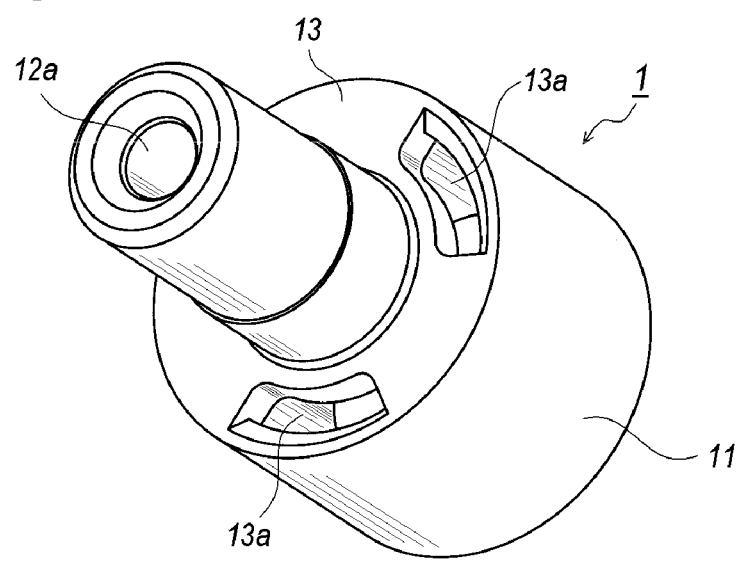
Figure 3:
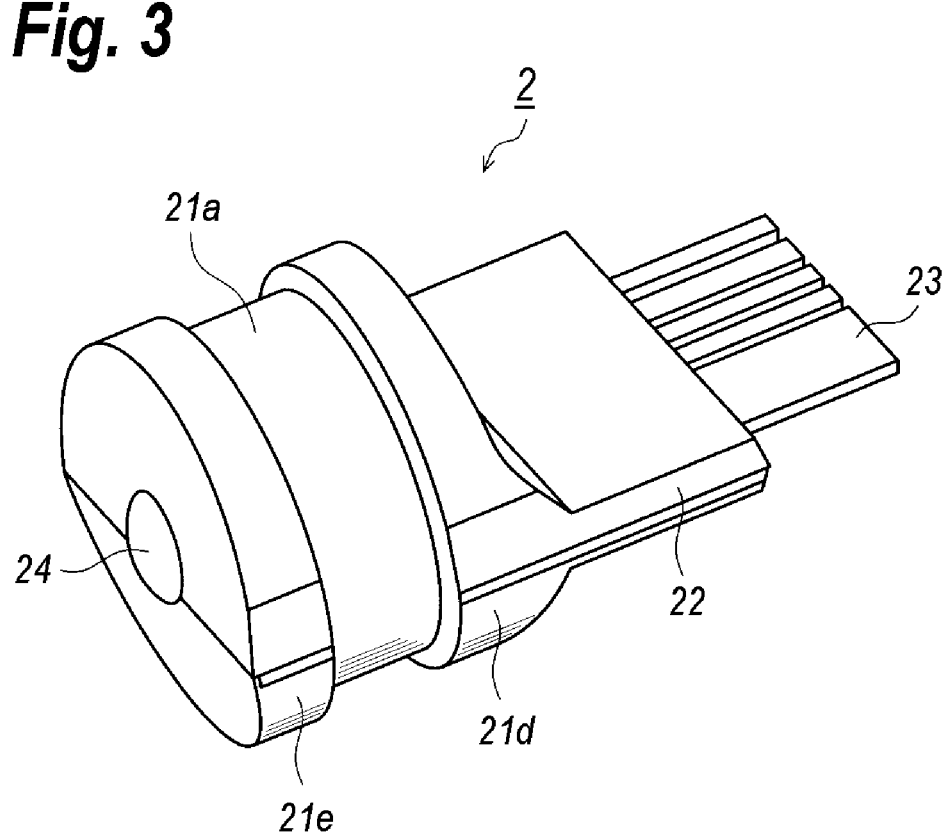
FIG. 3 is an outer appearance of the optical device according to one embodiment of the present invention.

An optical subassembly (hereafter denoted as OSA) provides an optical device and an optical receptacle that sets the optical device therein. FIG. 1 is a cross section of the OSA according to the present embodiment; FIGS. 2A and 2B are perspective views of the optical receptacle, where FIG. 2A views from the bottom while FIG. 2B views from the top; and FIG. 3 is a perspective view of the optical device.

The optical receptacle 1 of the present embodiment has a cylindrical shape whose axis is along the optical axis of the OSA. The optical receptacle 1 includes a sheath portion 11, a sleeve portion 12, and a step 13 between the sheath portion 11 and the sleeve portion 12, as illustrated in FIGS. 2A and 2B. While, the optical device 2 includes a pillar portion 21 and a flat portion 22. The pillar portion 21 encloses, for instance, a semiconductor laser diode for a transmitter OSA or a semiconductor photodiode for a receiver OSA, which is not shown in FIG. 3. A plurality of lead pins 23, which electrically connects such a semiconductor optical device with an external circuit, is extracted from the end of the flat portion 22. The pillar portion 21 provides a lens 24 in an end of the optical axis passing therethrough to enhance the optical coupling efficiency. FIG. 3 shows the optical device 2 primarily with a resin body; but the present invention is not restricted to those assemblies. An OSA whose optical receptacle is primarily made of metal in a sleeve portion thereof, or optical device has a metal package may implement the present invention.

The receptacle 1 has the sheath portion 11 and the sleeve portion 12 integrally molded with the sheath portion 11, but they may be molded independently and attached to each other after the molding. The resin may be Polyetherimide.

The sheath portion 11 provides a first bore 11b into which the optical device 2 is to be inserted, and an inner diameter of the first bore 11b is slightly greater than a diameter of the optical device 2. The sleeve portion 12 provides a second bore 12a with a second diameter into which an optical ferrule attached in a tip of an external fiber is to be inserted. The external fiber may be positioned in the tip thereof by being inserted into the second bore 12a. An open end 12b of the second bore 12a is chamfered to make the insertion of the ferrule smooth.

Between the first bore 11b and the second bore 12a is formed with an opening 14 and a connection bore 13b. The connection bore 13b has diameters gradually increasing from a side of the first bore 11b toward the opening 14. As described later, the connection bore 13b may provide a space to receive the lens 24 formed in the tip end of the pillar portion 21 of the optical device. The opening 14 is discontinuously connected with the second bore 12a so as to form a step 12c therebetween, against which the ferrule of the external fiber is abut to determine the position of the tip of the fiber. Light emitted from the optical device or that provided from the external fiber passes through the opening 14 and the connection bore 13b to enter the others. Thus, the optical device 2 set within the first bore 11b of the sheath portion 11 may be optically coupled with the optical fiber set within the second bore 12a.

An inner surface of the first bore 11b provides a plurality of circumferential ribs 11a. The present embodiment shown in FIG. 2A provides three ribs 11a uniformly arranged around the circumference, but the present invention is not restricted to those embodiments as far as a condition not to cause a stress due to non-uniform solidification of the ultraviolet curable resin is secured. Thus, a uniform arrangement of the ribs 11a around the circumference is preferable. Moreover, the ribs 11a provide a width able to set within the hollow formed in the periphery of the pillar portion 21 of the optical device 2.

The step 13 between the sheath portion 11 and the sleeve portion 12 provides a plurality of apertures 13a that penetrate the first bore 11b and locate in positions corresponding to the ribs 11a. The present embodiment shown in FIGS. 2A and 2B provides three apertures 13a, but the number of apertures 13a is not restricted to three as those of the ribs 11a. Also, the shape of the aperture 13a is not restricted to crescent shape. The first function of the aperture 13a is, as explained later, to pass the ultraviolet rays to cure the resin in the first bore 11b.

The optical device 2 provides, in the periphery of the pillar portion 21 thereof, the hollow 21a to receive the rib 11a when the pillar portion 21 is set within the first bore 11b. The hollow 21a may be a plurality of sections isolated to each other along the circumference of the pillar portion 21 so as to correspond to the position of the ribs 11a. The inner diameter of the first bore 11b measured at the top of the ribs 11a is necessary to be slightly larger than the outer diameter of the pillar portion 21 measured out of the hollow 21a, because the pillar portion 21 is necessary to be set within the first bore 11b without pressing the sheath portion 11. In the present embodiment, a difference of the diameters, that is, the inner diameter of the ribs 11a corresponding to an enveloping curve thereof and the outer diameter of the pillar portion 21, is secured to be at least 0.5 mm. In the embodiment of the optical device 2 shown in FIG. 3, two portions, 21d and 21e, putting the hollow 21a therebetween make a gap against the top of the ribs 11a when it is set within the first bore 11b. The optical alignment between the optical device 2 and the optical receptacle 1 may be carried out within this gap in a plane perpendicular to the optical axis.

The width of the hollow 21a may be greater than a width of the rib 11a along the optical axis, which secures a room to align the optical device along the optical axis. The rib 11a is occasionally set within the hollow 21a after the optical alignment is carried out between the optical device 2 and the optical receptacle 1. Even when such an arrangement is turned out, the rib 11a may slide within the hollow 21a. The present embodiment has a width of the hollow 21a wider than the width of the rib 11a with a width of 0.5 mm by at least about 1 mm.

Next, a method of assembling the optical subassembly 1 will be described. First, the optical device shown in FIG. 3 is prepared by mounting optical elements such as a semiconductor optical device on a lead frame and wire-bonding these elements to the lead frame. The mounting of the elements and the wire-bonding are done by using a post-process of an ordinary semiconductor manufacturing. Subsequently, the elements are molded by setting the lead frame with the elements within a cavity of the molding die and injecting a molding resin within the cavity. The molding resin is necessary to be transparent for the light subject to the semiconductor optical device within the mold. Solidifying the molding resin, the optical device shown in FIG. 3 is obtained.

For the optical receptacle 1, the process described below may be applicable. FIG. 5A illustrates an example of the upper die 50, while FIG. 5B illustrates an example of the lower die 40 each used for molding the optical receptacle. The upper die has a cylindrical member with a first bore 51a and a second bore 51b in the body 51. A center of the second bore 51b provides a center pillar 53 which corresponds to the second bore 12a of the sleeve portion 12. The first bore 51a of the upper die 50 provides a plurality of crescent fins 52a, where three fins 52a are appeared in the example shown in FIG. 5A. While, the lower die 40 provides two pillars, 42 and 44, and one cone 43, in which their axes are identical to each other, on the pillared base 41. The cone 43 corresponds to the connection bore 13b, while, the top pillar 44 forms the opening 14. The bottom pillar 42 provides a plurality of crescent hollows 42a, where FIG. 5B illustrates three hollows 52a equally arranged around the periphery of the pillar 42. These hollows 42a corresponds to and receives respective fins 52a provided in the upper die 50.

FIG. 5C shows two dies, 40 and 50, assembled each other so as to form a cavity in which mold resin is to be injected. Assembling the lower die 40 to with the upper die 50, the bores, 51a and 51b, form the cavity because the diameter of the first bore 51a is larger than the diameter of the first pillar 42, while, the second bore 51b becomes a portion of the cavity. As illustrated in FIG. 5C, the fin 52a fits with the hollow 42a so as to from a gap 51c between the top of the fin 52a and the bottom of the hollow 42a. This gap may form the rib 11a in the first bore 11b.

FIGS. 6A and 6B show processes to form the optical receptacle 1 using the dies, 40 and 50, shown in FIGS. 5A to 5C. After the injection of the molding resin, the lower die 40 is first removed to leave the first bore 11b, the connection bore 13b, and the opening 14. The fin 52a provided in first bore 51a of the upper die 50 is exposed in the first bore 11b so as to leave the rib 11a in the top of the fin 52a. Subsequently, the upper die 50 is removed from the optical receptacle 1 as illustrated in FIG. 6B. The center pillar 53 forms the second bore 12a of the receptacle 1, which becomes the optical sleeve to receive the ferrule attached to the tip of the external fiber. While, the fin 52a forms the window 13a in the step 13 between the sleeve portion 12 and the sheath portion 11. Because of the existence of the fin 52a in the upper die 50, the upper die 50 may be easily removed from the molded product only by slipping out the receptacle from the upper die 50. Thus, the optical receptacle 1 made of molding resin and providing the rib 11a in the inner surface of the first bore 11b may be obtained.

Next, applying the ultraviolet curable resin 30 on the periphery of the pillar portion 21 uniformly as possible, then inserting the optical device 2 into the first bore 11b, and performing the optical alignment between the optical device 2 and the optical receptacle within the gap therebetween; an intermediate product of the OSA 1 may be obtained. Next, the ultraviolet rays are irradiated from the side of the flat portion 22 and also through the apertures 13a. Because the ultraviolet rays are irradiated through the apertures 13a, the ultraviolet curable resin 30 filled in a depth of the first bore 11b may be easily solidified.

After the solidification of the ultraviolet curable resin 30 as maintaining the optical alignment, a thermo-curable resin is applied around a portion covering both the end of the sheath portion 11 and the pillar portion 21 not set within the first bore 11b, and the thermo-curable resin is thermally treated to be hardened. The thermo-curable resin may be applied from the side of the flat portion 22.

The ribs 11a in the first bore 11b may show a function of, what is called, the anchor effect that enhances the strength resistant for the optical device 2 to be slip out from the first bore 11b of the sheath portion 11, because the rib 11a may play a role of a brace within the resin 30. Moreover, the optical receptacle 1 of the present embodiment provides the apertures 13a, which enables to irradiate the resin 30 filled in the deep end of the first bore 11b to cure them fully. Thus, the fully cured resin 30 of the present embodiment may further enhance the anchor effect appeared by the ribs 11a.

Figure 4:
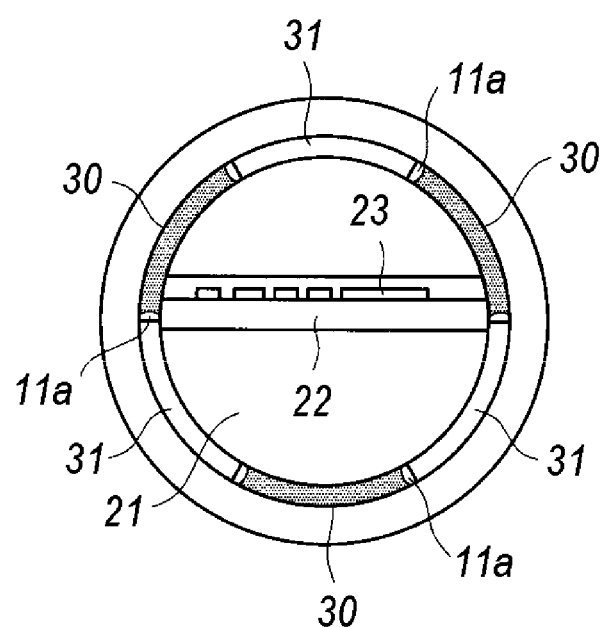
FIG. 4 is a cross section of an optical subassembly according to another embodiment of the present invention, where the optical subassembly is viewed from the open end of the optical receptacle.

FIG. 4, which is a cross section of the pillar portion 21 and the sheath portion 11, shows another example to assemble the OSA 1. The method described above applies the thermo-curable resin to the surface of the sheath portion 11 and that of the pillar portion 21 after curing the ultraviolet curable resin 30. While, the present embodiment applies the thermo-curable resin to the surface of the pillar portion 21 concurrently with the application of the ultraviolet curable resin 30. The process according to FIG. 4 first applies the ultraviolet curable resin 30 to areas in the periphery of the pillar portion 21 each isolated by vacant areas. Next, the pillar portion 21 is inserted within the sheath portion 11 so as to align the areas applied with the ultraviolet curable resin 30 with the ribs 11a. The optical alignment between the optical device 2 and the optical receptacle 1 is carried out in advance to the irradiation of the ultraviolet rays. After the optical alignment is completed, the irradiation of the ultraviolet rays is carried out from the gap between the pillar portion 21 and the inner bore 11b of the sheath portion 11 and through the apertures 13a. The former irradiation may cure the ultraviolet curable resin 30 applied to the bottom portion 21d, which is shallower side of the rib 11a, while, the latter irradiation may cure the resin 30 applied to the top portions 21e, which is deeper side of the rib 11a.

At the completion of the irradiation of the ultraviolet rays, vacant portions without any cured resin 30 are left between the areas corresponding to the ribs 11a. Then, the thermo-curable resin 31 is injected into those vacant areas unfilled with the cured resin 30. The thermo-curable resin 31 may be injected into the areas and spread out there by the capillarity. In this process, the thermo-curable resin may be injected from the side of the flat portion 22. After the injection of the thermo-curable resin 31, the assembly with the optical device 2 and the optical receptacle 1 are heat treated to solidify the thermo-curable resin 31.

The process described above applies the thermo-curable resign 31 only to the vacant areas between the ultraviolet curable resin 30, but, the optical subassembly may be applied with the thermo-curable resin to the portion on one of the pillar portion 21d exposed from the sheath portion 11 similar to the embodiment described previously.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An optical subassembly, comprising:
an optical device adapted to enclose a semiconductor optical device, said optical device having an optical axis; and
an optical receptacle made of resin, said optical receptacle including a sheath portion with a first bore and a sleeve portion with a second bore, said first bore receiving said optical device therein,
wherein said optical receptacle provides a plurality of apertures between said sleeve portion and said sheath portion, said apertures exposing a tip portion of said optical device inserted within said first bore of said sheath portion,
wherein said first bore provides a plurality of ribs in positions corresponding to said apertures and said optical device provides a hollow receiving said ribs therein, said hollow being filled with an ultraviolet cured resin, and wherein said ribs and said hollows are circumferentially formed around said optical axis.

2. The optical subassembly of claim 1, wherein said optical device has a pillar portion with a diameter, said pillar portion including said hollow.

3. The optical subassembly of claim 2, wherein said pillar portion circumferentially provides a plurality of hollows each receiving one of said ribs.

4. The optical subassembly of claim 2, wherein said optical device provides said hollow as a groove peripherally extending around said pillar portion.

5. The optical subassembly of claim 2, wherein said ribs provide an inner diameter corresponding to an enveloping curve thereof, and wherein said inner diameter is greater than said diameter of said pillar portion.

6. The optical subassembly of claim 1, wherein said optical device has a pillar portion made of resin transparent to light subject to said optical device.

7. A method for assembling an optical subassembly that includes an optical device having a hollow and an optical receptacle made of resin, said optical receptacle including a sheath portion, a sleeve portion, a plurality of apertures in a step between said sleeve portion and said sheath portion, and a plurality of ribs inside of said sheath portion corresponding to respective apertures, said hollow and said ribs being circumferentially arranged around an optical axis of said optical device, said method comprising steps of:
applying an ultraviolet curable resin on a periphery of said optical device so as to fill said hollow;
inserting said optical device into said optical receptacle so that said ribs of said receptacle fit within said hollow of said optical device; and
irradiating said ultraviolet curable resin with ultraviolet rays from a gap formed between said optical device and said optical receptacle, and through said apertures to cure said ultraviolet curable resin.

8. The method of claim 7, further comprising step of, after said step of said irradiation of said ultraviolet rays, applying a thermo-curable resin so as to cover said optical device and said optical receptacle simultaneously, and
heat-treating said thermo-curable resin.

9. The method of claim 7,
wherein said step of application of said ultraviolet curable resin further includes a step of applying a thermo-curable resin on said periphery of said optical device,
wherein said ultraviolet curable resin and said thermo-curable resin are alternately arranged around said periphery, and
wherein said method further comprises, after said step of said irradiation of said ultraviolet rays, a step of heat-treating said thermo-curable resin.

10. The method of claim 7,
further comprising steps of, before said application of said ultraviolet resin, molding said resin by using an upper die and a lower die, and
separating said upper die from said lower die to form said optical receptacle,
wherein said lower die includes a pillar with at least a hollow in an outer surface thereof and said upper die includes a bore provided with a fin extending along a longitudinal direction of said bore, said pillar and said bore being adapted to form said sheath portion of said optical receptacle,
wherein said fin has a height smaller than a length of said hollow so as to form said rib with a width corresponding to a difference between said height of said fin and said length of said hollow, and
wherein said fin forms said aperture.

* * * * *